UNITED STATES PATENT OFFICE.

ALLAN F. ODELL, OF BROOKLYN, NEW YORK.

PROCESS OF PRODUCING ORGANIC ACIDS.

1,425,605.  Specification of Letters Patent.  Patented Aug. 15, 1922.

No Drawing.  Application filed December 14, 1915. Serial No. 66,794.

*To all whom it may concern:*

Be it known that I, ALLAN F. ODELL, a citizen of the United States, residing at Brooklyn, in the county of Kings and State of New York, have invented certain new and useful Improvements in Processes of Producing Organic Acids, of which the following is a specification.

This invention relates to the manufacture of organic acids including tartaric acid and homologous acids, such as saccharic acid, ($CO_2H-(CHOH)_4-CO_2H$) and particularly to the production of such acids by oxidation of carbohydrates or saccharids or intermediate products formed from them by oxidation or hydrolysis. Specifically, the improved process consists in the oxidation of a carbohydrate or saccharid, such as starch, glucose, laevulose, sugar, maltose, lactose, molasses, gums, etc., by nitric acid, in the presence of a catalyzer, such, for instance, as vanadic or molybdic acid, oxids, salts, or other compounds of these metals, or oxids, salts or other compounds of cerium, thorium, tantalum, columbium, and other elements that form highly oxidized compounds and also exist in the form of lower oxids. These catalytic agents may be used either singly or in combination. For example, I have found that for certain purposes a combination of vanadic and molybdic compounds, is more efficient than such materials alone. Such bodies I designate as "metalliferous catalyzers."

In the course of the oxidation, there is formed along with the tartaric acid, (dicarboxylic) saccharic and other similar or homologous acids, as well as oxalic acid. In case it should not be desired to produce oxalic acid to as large an extent as possible, the yield of oxalic acid may be decreased by the use of a substance which acts as a destroyer or inhibitor to the production of this acid, such material being used for this purpose as preferably has the additional function of promoting the yield of tartaric acid, oxid of manganese being available for this purpose.

When the production of oxalic acid is not regarded as objectionable, there may be used as additional catalyzers, salts or other compounds of cobalt, nickel, and iron either singly or together, these materials apparently increasing the yield of tartaric acid, especially when used in conjunction with molybdic acid, while at the same time not inhibiting or destroying the formation of oxalic acid.

The following example will serve to illustrate the process, although the details can be considerably altered:—

400 grams of starch are made into a paste with 2,000 cc. of water, and with this are mixed 1,900 cc. of nitric acid (specific gravity 1.33), 0.5 gram of vanadic acid (or a mixture of 0.5 gram vanadic acid and 0.5 gram molybdic acid), with or without the addition of ten grams of manganese oxid, or a corresponding amount of a nickel or cobalt compound, such as the nitrate, or a mixture of such nickel and cobalt compounds. The mixture is heated gradually in any apparatus suitable for conducting off the gases evolved, until the reaction commences. This will occur when the temperature reaches about 90° centigrade. The temperature is then controlled as may be required, the preferred temperature not exceeding 115° C., and preferably being much lower than this. After oxidation is approximately complete, which, under these conditions, will require approximately two hours, about 100 cc. more of nitric acid may be added, and the heating continued a little longer, in order to insure more complete oxidation of any saccharid or any intermediate oxidation product remaining in the mixture. This last addition of acid is however usually unnecessary. During the oxidation, oxids of nitrogen are evolved. These may be collected and the nitric acid regenerated therefrom by any well-known method.

As a result of the above-described operation, there is produced a solution containing oxalic acid, tartaric acid, saccharic acid, and perhaps other homologous or allied organic acids. When a molybdenum compound is used as a catalyzer, there is always formed a larger proportion of saccharic acid than when a vanadium compound is used alone. In fact, when a molybdenum compound is used alone, the conditions may be so regulated as to produce only a small percentage of tartaric acid and a relatively large per cent of saccharic acid.

In order to separate and recover the several products, the solution, as soon as the reaction is over, is cooled to two or three degrees centigrade, and as much oxalic acid as will, is allowed to crystallize out. This is filtered off and the filtrate diluted with water to ten liters for each kilo of starch used, heated to boiling, and calcium carbonnate added until the effervescence becomes very feeble. The precipitate formed, which may be termed the "first precipitate," contains the remainder of the oxalic acid, a portion of the tartaric acid, and some saccharic acid, which may be recovered in a manner hereinafter described.

The filtrate contains the remainder of the tartaric and saccharic acids partially in the form of calcium salts. As saccharic acid acts on the calcium carbonate very slowly, if calcium carbonate is not added in excess, and the action thereof not allowed to continue too long, the saccharic acid will not be entirely neutralized, and what remains of the free saccharic acid will hold both the calcium tartrate and the calcium saccharate in solution.

Accordingly, this filtrate is not allowed to cool (in which case, it deposits some of its tartrate and saccharate of calcium as a sticky mixture, which solidifies to a vitreous mass after cooling, filtering, and drying), but hot milk of lime is added with boiling and stirring until the liquid gives an alkaline reaction with litmus. The boiling and stirring is continued until this second precipitated mass, which is at first amorphous and flocculent, assumes a structure more or less crystalline in appearance, whereupon the supernatant liquid is filtered off. The treatment of this second precipitate will be described later.

The first precipitate resulting from the treatment of the reaction mixture with calcium carbonate, and consisting of oxalate, tartrate and saccharate of calcium, may be treated with a strong hot calcium chlorid or nitrate solution, whereby the calcium tartrates and saccharates dissolve, leaving the calcium oxalate behind. The filtrate, on cooling, deposits a mixture of calcium tartrate and saccharate, which may be termed the third precipitate, and the residual solution of calcium chlorid or nitrate may be used over again.

Or the first precipitate may be treated with dilute calcium chlorid solution which will dissolve the calcium saccharate, leaving the calcium tartrate and oxalate undissolved. The mixture of calcium tartrate and oxalate may be treated with the requiste amount of oxalic acid to free the tartaric acid in the calcium salt and the tartaric acid filtered off leaving, as a residue, calcium oxalate, from which the oxalic acid may be obtained in any well-known manner.

The second precipitate produced by the addition of hot milk of lime, consists of a mixture of calcium tartrate and saccharate and is treated with cold water containing a very little hydrochloric acid,—just enough to neutralize any alkalinity due to an excess of lime. This is filtered and to the residue is added the mixture of calcium saccharate and tartrate produced by the previous operation above, and referred to as the third precipitate. The resulting mixture is then boiled with a 4 to 5% solution of calcium chlorid or nitrate. A boiling calcium chlorid solution of this strength will dissolve calcium saccharate, leaving the calcium tartrate undissolved. The filtrate will, upon cooling, deposit the calcium saccharate.

It is to be understood that the several separations referred to above are not necessarily quantitative, but are quite sufficient for most commercial purposes.

If it is desired to produce cream of tartar, directly, this may be effected by adding potassium carbonate solution to the original reaction solution, after the oxalic acid has been removed. This potassium carbonate solution should be added slowly until no further precipitate forms on stirring and shaking.

The tartaric acid obtained from the above tartrate may be, and usually is, a mixture of isomeric tartaric acids containing the ordinary dextro-tartaric acid with the inactive racemic acid, or meso- or possibly meta-tartaric acids, and it is to be understood that the term "tartaric acid" as used in the claims, includes such mixtures, as well as the ordinary dextro-tartaric acid alone.

While I have described the use of calcium salts, it is to be understood that appropriate salts of other alkaline-earth metals may be substituted, and are equivalent thereto.

The term "carbohydrate," as used in the claims, is to be read as including the saccharids specified at the beginning of this specification, and also such products as are formed from these by oxidation or hydrolysis, as for example, saccharic acid, saccharolactonic acid, gluconic acid, mucic acid, arabonic acid, etc.

The invention is not limited to the use of nitric acid in conjunction with a catalyzer, as I may substitute for the nitric acid, other oxidizing agents the action of which is accelerated by the catalyzer mentioned, such as chloric acid, hydrogen peroxid, etc.; or such oxidizing agents may be used in conjunction with nitric acid and the catalyzer.

This application is filed as a continuation in part of my prior application Serial No. 827,878, filed March 28, 1914, which discloses in part the subject-matter of this present application.

I claim:—

1. The process which consists in oxidizing a carbohydrate in the presence of a metalliferous catalyzer under such conditions that tartaric acid is produced and recovering the thus produced tartaric acid.

2. The process which consists in oxidizing a carbohydrate by nitric acid in the presence of a metalliferous catalyzer under such conditions that tartaric acid is produced, and recovering the thus produced tartaric caid.

3. The process of producing tartaric acid, which consists in oxidizing starch in the presence of a metalliferous catalyzer under such conditions that tartaric acid is produced, and recovering the thus produced tartaric acid.

4. The process of producing tartaric acid, which consists in oxidizing a carbohydrate in the presence of a vanadium compound under such conditions that tartaric acid is produced, and recovering the thus produced tartaric acid.

5. The process of producing tartaric acid, which consists in oxidizing starch in the presence of a vanadium compound under such conditions that tartaric acid is produced, and recovering the thus produced tartaric acid.

6. The process of producing tartaric acid, which consists in oxidizing starch by nitric acid in the presence of a metalliferous catalyzer under such conditions that tartaric acid is produced, and recovering the thus produced tartaric acid.

7. The process of producing tartaric acid, which consists in oxidizing a carbohydrate by nitric acid in the presence of a vanadium compound under such conditions that tartaric acid is produced, and recovering the thus produced tartaric acid.

8. The process of producing tartaric acid, which consists in oxidizing starch by nitric acid in the presence of a vanadium compound under such conditions that tartaric acid is produced, and recovering the thus produced tartaric acid.

9. The process, which consists in oxidizing a carbohydrate, in the presence of a metalliferous catalyzer, treating the reaction-products with a calcium salt to precipitate oxalic, tartaric, and saccharic acids, in the form of their salts, filtering, precipitating from the filtrate, a mixture of the salts of tartaric and saccharic acids, treating the latter precepitate with a dilute solution of a soluble calcium salt to dissolve calcium saccharate, filtering to recover the undissolved calcium tartrate and recovering the calcium saccharate from the filtrate.

10. The process which consists in oxidizing a carbohydrate, in the presence of a metalliferous catalyzer, treating the reaction-products with a calcium salt to precipitate oxalic, tartaric, and saccharic acids, in the form of their salts, filtering, precipitating from the filtrate, a mixture of the salts of tartaric and saccharic acids, by boiling with hot milk of lime, filtering, treating the latter precipitate with a dilute solution of a soluble calcium salt to dissolve calcium saccharate, filtering to recover the undissolved calcium tartrate and recovering the calcium saccharate from the filtrate.

11. The process which consists in oxidizing a carbohydrate, in the presence of a metalliferous catalyzer, treating the reaction-products with a calcium salt to precipitate oxalic, tartaric, and saccharic acids, in the form of their salts, filtering, precipitating from the filtrate, a mixture of the salts of tartaric and saccharic acids, heating the latter precipitate with a dilute solution of a soluble calcium salt, filtering to recover the undissolved calcium tartrate and cooling the filtrate to deposit calcium saccharate therefrom.

12. In the manufacture of organic acids, the sub-process of treating a material containing mixed salts of tartaric and saccharic acids, which consists in heating the material with a soluble calcium salt solution to dissolve the saccharic acid salt, filtering to recover the undissolved tartrate salt, and cooling the filtrate to deposit the saccharate salt therefrom.

13. In the manufacture of organic acids, the sub-process of treating a material containing mixed salts of tartaric and saccharic acids, which consists in treating the material with a soluble calcium salt solution to dissolve the saccharic acid salt, filtering, recovering the undissolved tartrate salt, and recovering the saccharate salt from the filtrate.

14. In the manufacture of organic acids, the sub-process of treating materials containing salts of oxalic, tartaric, and saccharic acids, which consists in heating the same with a solution of calcium chlorid, filtering to recover the undissolved calcium oxalate, and recovering from the filtrate mixed calcium tartrate and calcium saccharate.

15. In the manufacture of organic acids, the sub-process of treating materials containing oxalic, tartaric, and saccharic acids, which consists in heating the same with a solution of calcium chlorid, filtering to recover the undissolved calcium oxalate, and cooling the filtrate to deposit from the filtrate mixed calcium tartrate and calcium saccharate.

16. The process of producing a tartaric acid which consists in heating a carbohydrate with an oxidizing agent in the presence of a metalliferous catalyzer.

17. The process of producing a tartaric acid which consists in heating carbohydrate with nitric acid in the presence of a metalliferous catalyzer.

In testimony whereof I affix my signature.

ALLAN F. ODELL.